Dec. 26, 1933.    F. D. MAHONE    1,940,762
SEPARATOR FOR TREATED EMULSIONS
Filed Aug. 15, 1932    2 Sheets-Sheet 2
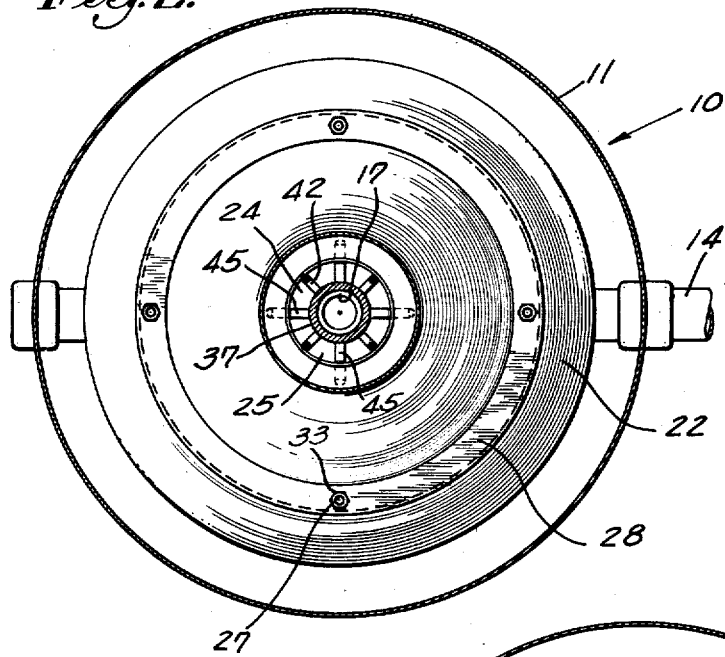
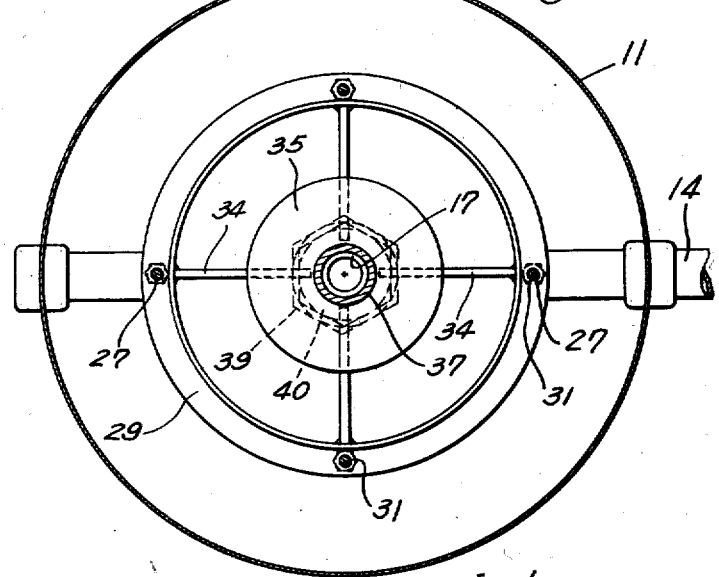
INVENTOR:
FRANCIS D. MAHONE,
By
ATTORNEY.

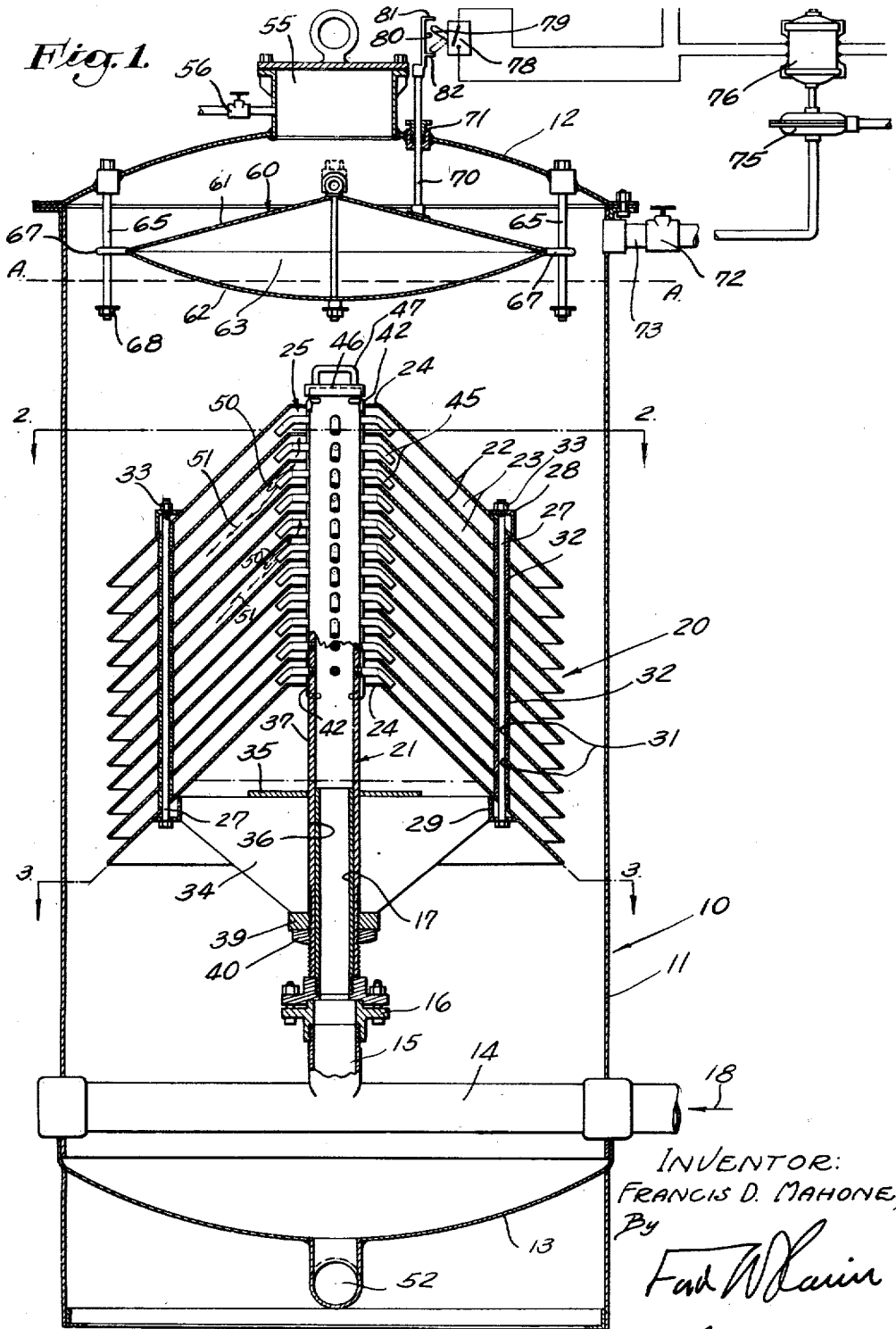

Patented Dec. 26, 1933

1,940,762

UNITED STATES PATENT OFFICE 1,940,762

SEPARATOR FOR TREATED EMULSIONS

Francis D. Mahone, Long Beach, Calif., assignor to Petroleum Rectifying Company of California, Los Angeles, Calif., a corporation of California Application August 15, 1932. Serial No. 628,824

14 Claims. (Cl. 210—47)

My invention relates to a device for separating the constituents of a mixture, and finds particular utility in the art of separating mixtures including a continuous phase of water with oil or other particles suspended therein. It is in this capacity that the invention will be particularly described without limiting myself thereto.

One of the most important uses of the present invention is in the art of separating the constituents of a petroleum emulsion. Such emulsions are usually of the water-in-oil type, and one widely used method of separating the water from the oil is by the use of a high-potential alternating-current electric field. Such an electric field coalesces the water particles into masses of sufficient size to gravitate from the oil, the water being withdrawn from the lower end of the electric field. This water is not, however, pure, and when certain emulsions are being treated it has been found that oil particles are associated therewith. Such a contaminated water bleed of an electric dehydrator is objectionable both from an economic viewpoint and from the fact that disposal of such a mixture is often a difficult problem in view of statutes prohibiting discharge of such oil-containing liquid into natural bodies of water, sewers, etc.

Upon careful analysis, I have found that such a contaminated water bleed carries colloidal matter, usually in the form of minute particles, and that this colloidal matter has become oil-wetted and is associated with the minute oil particles. I have found that by suitably washing the mixture it is possible to make the colloidal matter come into contact with water and become water-wetted so that it is absorbed into the water phase and readily separates from the oil with the water.

It is an object of the present invention to suitably wash a mixture of oil and water, the oil carrying colloidal material, whereby the colloidal material is transferred from the oil to the water. This can be done in a number of different ways. In the preferred mode of operation, the water phase of the mixture is itself used as a washing medium, and it is a further object of the invention to effect such a washing of the oil particles by gently agitating the mixture.

One very satisfactory mode of effecting such an agitation is to force the mixture through a restricted orifice or nozzle whereby turbulence is set up therein which brings the water into contact with the colloidal material previously associated with the oil particles. It is an object of this invention to utilize such a method, and to provide an apparatus for thus agitating the mixture.

Another mode of washing the mixture, using the water phase of the washing medium, is to inject this mixture into a body of previously separated water, and it is another object of the invention to utilize this manner of effecting a washing action.

Once the colloidal matter is separated from the oil particles, these oil particles tend to rise due to their being of different density from the surrounding water. Experience has shown, however, that these oil particles do not readily associate themselves with adjacent oil particles in the absence of some additional force tending to rupture the minute but very fragile films surrounding each particle of oil. In the present invention I utilize a mechanical force for rupturing these films and agglomerating the oil particles into a stream or body of oil, and it is an object of this invention to build up on such dispersed particles forces acting to move said particles into pressural contact with each other to effect agglomeration.

In the preferred embodiment of the invention I utilize a plurality of conical baffles so positioned as to diverge downward, each baffle including a central opening. Adjacent baffles cooperate in defining settling passages which slope downward and outward, the mixture being introduced into these settling passages. The oil particles need move only a short distance before contacting the underneath side of the upper baffle, and these oil particles then flow upward along the under surface and toward the central opening. This automatically brings the oil particles into pressural contact with each other, for the particles are crowded together as they near this central opening.

It is an object of the present invention to provide an improved separating device including sloping baffles which cooperate in defining settling passages, as well as to provide a novel introduction means for introducing the mixture into these passages.

Another object of the invention is to provide a structure in which the relative positions of the baffles and the introduction means can be adjusted so that the incoming mixture can be discharged into a desired portion of the settling passages.

A further object of the invention is to provide a separating device which can be removed from a tank as a unit.

Further objects of the invention provide a novel apparatus for automatically withdrawing the constituents from the separating tank.

Further objects of the invention lie in the structural relationships of the apparatus to be hereinafter described, and other objects and advantages will be evident from the following description.

Referring to the drawings,—

Fig. 1 is a vertical sectional view of the preferred form of separator.

Figs. 2 and 3 are sectional views taken on corresponding lines of Fig. 1.

The separator is enclosed in a tank 10 comprising a shell 11 closed at its upper and lower ends by heads 12 and 13, the head 12 being removable. The lower end of this shell is normally filled with water to a level indicated in Fig. 1 by the line A—A, while the upper end of the tank above the level A—A is filled with oil, as will be hereinafter described.

Extending across the lower end of the tank 10 is a supply pipe 14 providing a leg 15 to which a coupling 16 is secured. The upper end of this coupling retains a stand-pipe 17, and the incoming mixture moves into the pipe 14, as indicated by the arrow 18, and flows upward through the stand-pipe 17.

The stand-pipe 17 retains a separating device 20 which is lowered into the tank 10 as a unit prior to the time that the upper head 12 is secured in place. This separating device includes two units, one a discharge means 21, and the other a baffle unit comprising a plurality of superimposed baffles 22 spaced from each other to define settling passages 23 therebetween.

Each baffle 22 is of conical shape and diverges downward. A central opening 24 is provided in each baffle 22, these central openings being aligned with each other and cooperating to define a discharge passage 25.

The baffle unit is composed of a large number of these baffles held together by rods 27 extending between upper and lower head members 28 and 29 of annular shape. Each baffle 22 provides side openings 31 corresponding in number to the number of rods used. The rods extend through these side openings and carry spaces 32 between each baffle to space adjacent baffles from each other to provide the proper size of settling passages. The baffle unit may conveniently be clamped by utilizing long bolts extending between the head members 28 and 29 and carrying nuts 33 threaded thereto to draw the head members into clamping relationship with the baffles and spacers.

The lower head member comprises a plurality of inward extending fins 34 which carry an annular plate 35 to which they are secured. The central opening in the annular plate 35 provides a central passage 36 through which a pipe 37 extends, this pipe forming a part of the discharge means 21. This pipe 37 is of such internal diameter that the stand-pipe 17 slides thereinto, the lower end of the pipe 37 contacting the coupling 16 and being threaded to receive a nut 39 and a lock-nut 40 which adjustably support the baffle unit through the fins 34.

The discharge means 21 is centralized with respect to the discharge passage 25 by means of a plurality of rods 42 bent inward at their ends to be secured to the pipe 37, the central portions of the rods extending in spaced relationship with the surface of the pipe and engaging the walls of the central openings 24 of the baffles 22 to form a centering means. Three or more of these rods may be used, Figs. 1 and 2 illustrating four such rods.

The discharge means 21 acts to distribute the incoming mixture to the settling passages 23. This is accomplished by forming a plurality of groups of holes in the pipe 37, the groups being spaced center-to-center a distance equal to the center-to-center spacing of the settling passages measured on a vertical axis. Each group includes a plurality of outward extending holes, these holes preferably lying in the same plane. In the preferred embodiment, nozzles 45 are utilized at each hole and extend outward and downward at an angle corresponding to the angle of the baffles, these nozzles extending into the settling passages to discharge the mixture into the settling passages at a point intermediate its inner and outer ends. These nozzles may be formed of bent pipe nipples or may each be formed of two pipe nipples joined by an obtuse-angle elbow. The upper end of the pipe 37 is closed by a cap 46 so that all of the mixture is forced from the nozzles and into the settling passages.

It will be noted that the cap 46 carries a ring 47 by which the entire separating device 20 can be removed from the upper end of the tank 11. So also, it will be clear that the relative vertical positions of the nozzles 45 and the settling passages 23 can be changed by changing the relative positions of the baffles 22 and the pipe 37. This can readily be accomplished after the separating device 20 is removed from the tank 10 by suitably adjusting the nuts 39 and 40.

In the operation of the invention the tank 10 is filled substantially to the level A—A with water. The incoming emulsion of oil in the continuous phase of water is forced through the supply pipe 14 and is distributed by the holes in the pipe 37. In the event that the nozzles 45 are utilized, this oil mixture moves outward through the nozzles and is discharged in the settling passages 23 at a section intermediate the inner and outer ends thereof. The colloidal material usually present in such an emulsion is in the form of minute particles and, as previously set forth, I have found that by utilization of a suitable washing step it is possible to bring the colloidal material into contact with the water so that it becomes water-wetted, thus removing it from the oil particles and associating the colloidal matter with the water so that it is removed therewith. In the preferred mode of operation the water phase of the incoming emulsion is utilized as a washing medium and the holes in the pipe 37 and the nozzles are so designed that the agitation set up as the emulsion moves therethrough effects this desirable washing operation. Other types of agitation may, of course, be used, but this method wherein the emulsion is agitated due to the passages through which it passes is the simplest mode of accomplishing the desired end. The desirable degree of agitation will depend on the emulsion undergoing treatment. The apparatus shown also effects a further washing action when the mixture is discharged from the nozzles 45 and into the settling passages, for these settling passages are in the main filled with water which has previously separated from the mixture or which was preliminarily introduced into the tank. Both washing steps tend to move the colloidal matter into contact with the water.

It is very desirable in separating the oil particles in the emulsion to provide a system requiring only a minimum of movement of these oil particles before they are agglomerated. The apparatus shown is admirably suited to this end, for the particles of oil after being discharged from the nozzles 45 need move only a minute distance until they come into contact with the under surface of one of the baffles. The water particles and the colloidal material, on the other hand, move downward only a short distance until they come into contact with the upper surface of one of these baffles. Due to the difference in density between the oil and water, there is thus a tendency for the water to flow downward along the upper side of each baffle in the lower portion of each settling passage and a tendency for the oil to flow upward along the under surface in the upper portion of each settling passage.

Even after the oil particles begin to separate from the water they do not immediately agglomerate into a mass of oil unless some further tendency to effect this agglomeration is set up. Apparently, each oil particle is surrounded by a minute film of material which tends to retain this particle of oil as an entity. If, incidentally, such a particle of oil moves adjacent and even into contact with another similar particle of oil, no agglomeration will take place unless the particles are brought into pressural relationship or unless some agitation is utilized for disrupting the film. The apparatus disclosed in Fig. 1 has been designed to automatically effect such a pressural contact between the oil particles which separate, for as these oil particles move upward in the settling passages they are crowded together, as it were, due to the tendency thereof to move upward in these settling passages and due to the decreasing cross-sectional area of the settling passages toward the center thereof. The result is that the individual particles as they move upward are squeezed together in such a way as to disrupt the films surrounding the individual particles and thus agglomerate into a stream of oil which is discharged from the inner ends of the settling passages and into the discharge passage 25, as indicated by the arrows 50 of Fig. 1. The water, on the other hand, moves downward and outward in these settling passages 23, as indicated by the arrows 51, this water being discharged into the space between the separating device 20 and the tank 10, in which space it can drop downward into the lower end of the tank and be withdrawn through a pipe 52 in the conventional manner.

The dry oil rising from each of the settling passages joins into a stream of oil rising through the discharge passage 25. It is an important feature of this invention to maintain this stream of oil in the central portion of the tank and in a relatively compact stream rather than distributing the oil in a much more extensive stream in the outer portions of the tank, as would be effected if the settling passages sloped upward from the nozzles 45 rather than downward therefrom. This compact stream of oil thus prevents redispersion of the oil in the water below the level A—A and the result is that a single stream of oil moves upward into the upper part of the tank 10, the oil separating at substantially the level A—A.

Such emulsions as are effectively treated by the treater often carry dissolved gas particles. Such particles also assist in the upward movement of the oil both in the settling passages and in the discharge passage 25 due to the relatively low density of the gas as compared with the water and oil. If such gas is liberated in the settling passages, it will carry the oil upward and will separate from the oil in the upper portion of the tank, filling a gas chamber 55 formed in the cover 12. A suitable manually or automatically operated gas draw-off valve 56 may be utilized for moving the gas.

Any suitable means may be utilized for withdrawing the oil from the upper end of the tank 11. In the preferred embodiment I prefer to use an automatic system including a float 60 formed of upper and lower plates 61 and 62 joined at their outer ends but spaced at the central portions thereof to provide a chamber 63. This chamber is partially filled with liquid or solid material to such an extent that the density of the float 60 is between the density of oil and water. The float will thus rise in the water and not in the oil, the net result being that the float will move up and down with any change in the level A—A. Suitable guide means are provided for this float, such as rods 65 secured to and depending from the upper head 12. Rings 67 secured to the float 60 slide along the rods 65, nuts 68 being secured to the lower ends of these rods to prevent the rings 67 moving from these rods.

The motion of the float 60 can be transmitted to the exterior of the tank 10 by any suitable means such as a link 70 extending through a stuffing box 71 of the upper head 12. The movement of this link will visually indicate to the operator the position of the level A—A and he can control the flow of oil from the upper end of the tank accordingly, as by regulating a valve 72 in an oil draw-off pipe 73. In the preferred embodiment, however, I prefer to automatically control the oil flowing through the pipe 73 in response to the position of the float 60. This may be done, for instance, by utilizing a pump 75 intaking from the tank 10 through the pipe 73 and driven by a motor 76. The control switch of the motor is indicated by the numeral 78, this switch being preferably of the toggle type and providing an operating arm 79 which extends into a channel 80 formed between upper and lower legs 81 and 82 of the link 70. When the float drops to such an extent that the leg 81 moves the operating arm 79 from its full line position to its dotted line position, the switch 78 is closed, thus starting the motor and drawing oil from the upper end of the tank until the float rises sufficiently to permit the leg 82 to return the operating arm 79 of the switch 78 to its full line position at which time the motor will be de-energized, thus stopping the pump 75.

I claim as my invention:

1. A method of separating the constituents of a mixture composed of a continuous phase of water with particles of oil and colloidal matter carried thereby, which method includes the steps of: forcing a relatively small stream of said mixture downwardly into a body of water between downwardly sloping substantially parallel surfaces whereby said colloidal matter comes into contact with this water and tends to gravitationally separate; separating the oil particles from the water by collecting and bringing said oil particles into pressural contact with each other upon the upper one of said surfaces whereby said oil particles agglomerate to form a stream of oil flowing up said upper surface; moving said stream of oil vertically upward through said body of water without subsequent dispersion; and collecting the oil in said stream of oil at a position above said body of water.

2. A method of separating the constituents of a mixture composed of a continuous phase of water with particles of oil and colloidal matter carried thereby, which method includes the steps of: forcing said mixture through a restricted passage downwardly into a body of water between downwardly sloping surfaces whereby the colloidal matter associated with said oil particles comes into contact with said water and settles in said water after discharge through said restricted passage, thus releasing said oil particles which tend to rise in said water; separating the oil particles from the water; by collecting and bringing said oil particles into pressural contact with each other on the upper one of said surfaces whereby said oil particles agglomerate to form a stream of oil following up said upper surface.

3. In a separator for separating the constituents of a mixture the continuous phase of which is water, and including oil particles suspended in said water, the combination of: a tank containing a body of water in the lower end; a plurality of downwardly diverging baffles cooperating in defining settling passages and positioned one above the other in said body of water, each baffle providing a central opening, the central openings being in alignment to provide a discharge passage in which oil may rise, the periphery of each baffle being smaller than said tank to form a passage means in which the water may drop; and means for introducing said mixture into said settling passages at a section between said discharge passage and the outer portion of each settling passage whereby the water moves outward to said passage means and the oil particles move inward into said discharge passage in pressural engagement with each other due to the slope of said settling passages and the difference in density between said oil and water, said pressural engagement agglomerating the oil particles into a body of oil which rises centrally in said tank through said discharge passage.

4. In a separator for separating the constituents of a mixture the continuous phase of which is water, and including oil particles suspended in said water, the combination of: a tank containing a body of water in the lower end; a plurality of downwardly diverging baffles cooperating in defining settling passages and positioned one above the other in said body of water, each baffle providing a central opening, the central openings being in alignment to provide a discharge passage in which oil may rise; a pipe extending through said discharge passage and providing openings through which the interior of said pipe communicates with said settling passages, said pipe being smaller in diameter than said central openings of said baffles; and means for supplying said mixture to said pipe whereby streams of said mixture are introduced into said settling passages, said water moving outward and being discharged from the outer portions of said settling passages, said oil particles moving inward into said discharge passage in pressural engagement with each other due to the slope of said settling passages and to the difference in density between said oil and water, said pressural engagement agglomerating the oil particles into a body of oil which rises centrally in said tank through said discharge passage.

5. In a separator for separating the constituents of a mixture the continuous phase of which is water, and including oil particles suspended in said water, the combination of: a tank containing a body of water in the lower end; a plurality of downwardly diverging baffles cooperating in defining settling passages and positioned one above the other in said body of water, each baffle providing a central opening, the central openings being in alignment to provide a discharge passage in which oil may rise; a pipe extending through said discharge passage and providing openings through which the interior of said pipe communicates with said settling passages, said pipe being smaller in diameter than said central openings of said baffles; nozzle means extending outward and downward from said pipe and communicating with said openings, said nozzle means discharging into said settling passages; and means for supplying said mixture to said pipe whereby streams of said mixture are introduced into said settling passages, said water moving outward and being discharged from the outer portions of said settling passages, said oil particles moving inward into said discharge passage in pressural engagement with each other due to the slope of said settling passages and to the difference in density between said oil and water, said pressural engagement agglomerating the oil particles into a body of oil which rises centrally in said tank through said discharge passage.

6. In a separator, the combination of: a tank; a plurality of superimposed baffles in said tank and spaced from each other to define settling passages, said baffles providing aligned openings defining a discharge passage; a pipe extending through said discharge passage and being of smaller diameter than said openings so as not to obstruct said discharge passage, said pipe providing openings therein; nipples respectively communicating with said openings of said pipe and extending into said settling passages; and centering means for centering said pipe with respect to said openings.

7. In a separator, the combination of: a tank; a plurality of superimposed baffles in said tank and spaced from each other to define settling passages; a pipe extending through said settling passages and providing a plurality of openings communicating with said settling passages, said openings being formed in groups, one group for each settling passage, and the openings of adjacent groups being spaced center-to-center a distance equal to the distance between adjacent settling passages, said baffles being supported on said pipe; and means for adjustably changing the relative longitudinal positions of said pipe and said baffles to align said openings with various desired sections of said settling passages.

8. A combination as defined in claim 7 including nozzles communicating with said openings of said pipe and extending into said settling passages to discharge at a point intermediate the ends of said settling passages.

9. In a separator, the combination of: a tank; a discharge pipe extending upward into said tank; and a separating device insertable as a unit into said tank and supported by said discharge pipe, said separating device including a plurality of superimposed baffles defining settling passages and including a pipe communicating with said discharge pipe and with said settling passages, said communicating pipe slidably telescoping with said discharge pipe and means for mounting said superimposed baffles upon said pipe as a unit.

10. In a separator, the combination of: a tank; a plurality of conical baffles, each baffle including a central opening and a plurality of side openings; upper and lower head members at opposite ends of said plurality of baffles; rods extending through said side openings and through said head members; spacer means cooperating with said rods for spacing said baffles with respect to each other; a pipe extending through said central openings of said baffles and providing openings communicating with said settling passages; and means for delivering a mixture to said pipe.

11. In a separator, the combination of: a plurality of baffles; spacer means for spacing said baffles one above the other to define settling passages; a lower head member supporting said baffles and providing a central passage; a pipe slidable in said central passage and providing openings communicating with said settling passages; and means adjustably mounted on said pipe and supporting said head member whereby the relative positions of said openings and said settling passages may be varied.

12. In a separator, the combination of: a tank; a plurality of superimposed baffles in said tank and spaced from each other to define settling passages, said baffles providing aligned openings defining a discharge passage; a pipe extending through said discharge passage and being of smaller diameter than said openings so as not to obstruct said discharge passage, said pipe providing openings communicating with said settling passages; and centering means for centering said pipe with respect to said openings of said baffles, said centering means including means extending outward from said pipe and slidably engaging the walls of said openings of said baffles.

13. In a separator, the combination of: a tank; a plurality of superimposed baffles in said tank and spaced from each other to define settling passages, said baffles providing aligned openings defining a discharge passage; a pipe extending through said discharge passage and being of smaller diameter than said openings so as not to obstruct said discharge passage, said pipe providing openings communicating with said settling passages; and centering means for centering said pipe with respect to said openings of said baffles, said centering means including a plurality of rods extending longitudinally along, but spaced from, the surface of said pipe, said rods slidably engaging the walls of said openings of said baffles.

14. In a separator, the combination of: a tank; a plurality of superimposed baffles in said tank and spaced from each other to define inclined settling passages, the periphery of said baffles being smaller than said tank to define a passage means therebetween, said baffles providing aligned openings defining a discharge passage; a pipe extending through said discharge passage but being of smaller diameter than said openings so as not to obstruct said discharge passage; a plurality of nipples communicating with the interior of said pipe and extending outward therefrom and into said settling passages, said nipples terminating at positions intermediate the ends of the settling passages; and means for delivering a mixture to said pipe, said nipples discharging said mixture into said settling passages at sections intermediate the ends thereof whereby the lighter constituent of said mixture moves upward in said settling passages and the heavier constituent of said mixture moves downward in said settling passages.

FRANCIS D. MAHONE.

CERTIFICATE OF CORRECTION.

Patent No. 1,940,762.           December 26, 1933.

FRANCIS D. MAHONE.

It is hereby certified that error appears in the printed specification of the above numbered patent requiring correction as follows: Page 4, line 10, claim 2, strike out the semicolon; and line 14, claim 2, for "following" read flowing; and that the said Letters Patent should be read with these corrections therein that the same may conform to the record of the case in the Patent Office.

Signed and sealed this 6th day of February, A. D. 1934.

F. M. Hopkins

Acting Commissioner of Patents.

(Seal)

for spacing said baffles with respect to each other; a pipe extending through said central openings of said baffles and providing openings communicating with said settling passages; and means for delivering a mixture to said pipe.

11. In a separator, the combination of: a plurality of baffles; spacer means for spacing said baffles one above the other to define settling passages; a lower head member supporting said baffles and providing a central passage; a pipe slidable in said central passage and providing openings communicating with said settling passages; and means adjustably mounted on said pipe and supporting said head member whereby the relative positions of said openings and said settling passages may be varied.

12. In a separator, the combination of: a tank; a plurality of superimposed baffles in said tank and spaced from each other to define settling passages, said baffles providing aligned openings defining a discharge passage; a pipe extending through said discharge passage and being of smaller diameter than said openings so as not to obstruct said discharge passage, said pipe providing openings communicating with said settling passages; and centering means for centering said pipe with respect to said openings of said baffles, said centering means including means extending outward from said pipe and slidably engaging the walls of said openings of said baffles.

13. In a separator, the combination of: a tank; a plurality of superimposed baffles in said tank and spaced from each other to define settling passages, said baffles providing aligned openings defining a discharge passage; a pipe extending through said discharge passage and being of smaller diameter than said openings so as not to obstruct said discharge passage, said pipe providing openings communicating with said settling passages; and centering means for centering said pipe with respect to said openings of said baffles, said centering means including a plurality of rods extending longitudinally along, but spaced from, the surface of said pipe, said rods slidably engaging the walls of said openings of said baffles.

14. In a separator, the combination of: a tank; a plurality of superimposed baffles in said tank and spaced from each other to define inclined settling passages, the periphery of said baffles being smaller than said tank to define a passage means therebetween, said baffles providing aligned openings defining a discharge passage; a pipe extending through said discharge passage but being of smaller diameter than said openings so as not to obstruct said discharge passage; a plurality of nipples communicating with the interior of said pipe and extending outward therefrom and into said settling passages, said nipples terminating at positions intermediate the ends of the settling passages; and means for delivering a mixture to said pipe, said nipples discharging said mixture into said settling passages at sections intermediate the ends thereof whereby the lighter constituent of said mixture moves upward in said settling passages and the heavier constituent of said mixture moves downward in said settling passages.

FRANCIS D. MAHONE.

CERTIFICATE OF CORRECTION.

Patent No. 1,940,762.    December 26, 1933.

FRANCIS D. MAHONE.

It is hereby certified that error appears in the printed specification of the above numbered patent requiring correction as follows: Page 4, line 10, claim 2, strike out the semicolon; and line 14, claim 2, for "following" read flowing; and that the said Letters Patent should be read with these corrections therein that the same may conform to the record of the case in the Patent Office.

Signed and sealed this 6th day of February, A. D. 1934.

F. M. Hopkins

Acting Commissioner of Patents.

(Seal)